(12) United States Patent
Covaro et al.

(10) Patent No.: US 6,576,833 B2
(45) Date of Patent: Jun. 10, 2003

(54) CABLE DETECT AND EMI REDUCTION APPARATUS AND METHOD

(75) Inventors: Mark Covaro, Oakland, CA (US); Gordon MacKay, Santa Clara, CA (US); Gopakumar Parameswaran, Santa Clara, CA (US); Robert Gregory Twiss, Portola Valley, CA (US); Robert D. Hastings, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 127 days.

(21) Appl. No.: 09/834,957

(22) Filed: Apr. 12, 2001

(65) Prior Publication Data

US 2002/0024261 A1 Feb. 28, 2002

Related U.S. Application Data

(62) Division of application No. 09/330,478, filed on Jun. 11, 1999, now Pat. No. 6,462,435.

(51) Int. Cl.⁷ .................................................. H05K 9/00
(52) U.S. Cl. ........................ 174/35 GC; 174/35 C; 174/35 R; 439/609; 439/927
(58) Field of Search ...................... 174/35 GC, 35 C, 174/35 MS, 35 R; 439/108, 607, 608, 609, 610, 927, 939

(56) References Cited

U.S. PATENT DOCUMENTS

| | | | | |
|---|---|---|---|---|
| 3,533,045 A | | 10/1970 | Henschen | 339/17 |
| 3,652,899 A | | 3/1972 | Henschen | 317/101 |
| 3,704,394 A | | 11/1972 | Johnson | 317/101 |
| 3,905,665 A | | 9/1975 | Lynch et al. | 339/17 |
| 4,529,257 A | * | 7/1985 | Goodman et al. | 439/271 |
| 4,537,458 A | * | 8/1985 | Worth | 439/497 |
| 4,688,868 A | * | 8/1987 | Noyes | 439/108 |
| 4,832,619 A | | 5/1989 | Eck et al. | 439/377 |
| 4,869,680 A | | 9/1989 | Yamamoto et al. | 439/327 |
| 5,016,142 A | | 5/1991 | White | 361/415 |
| 5,123,859 A | | 6/1992 | Davis et al. | 439/405 |
| 5,181,858 A | | 1/1993 | Matz et al. | 439/188 |
| 5,186,635 A | * | 2/1993 | Pechulis et al. | 439/89 |
| 5,222,168 A | | 6/1993 | Saito et al. | 385/59 |
| 5,291,368 A | | 3/1994 | Conroy-Wass | 361/796 |
| 5,317,105 A | * | 5/1994 | Weber | 174/35 GC |
| 5,491,418 A | | 2/1996 | Alfaro et al. | 324/402 |
| D372,708 S | | 8/1996 | Hetherington | D14/114 |
| D382,857 S | | 8/1997 | Chen et al. | D13/147 |
| 5,660,567 A | | 8/1997 | Nierlich et al. | 439/620 |
| D386,473 S | | 11/1997 | England et al. | D13/147 |
| 5,716,221 A | | 2/1998 | Kantner | 439/64 |
| 5,757,618 A | | 5/1998 | Lee | 361/686 |
| 5,757,998 A | | 5/1998 | Thatcher et al. | 385/75 |
| 5,767,999 A | | 6/1998 | Kayner | 359/163 |
| 5,801,928 A | | 9/1998 | Burstedt et al. | 361/801 |
| 5,809,328 A | | 9/1998 | Nogales et al. | 395/825 |
| 5,836,785 A | | 11/1998 | Lee | 439/505 |
| 5,879,173 A | | 3/1999 | Poplawski et al. | 438/138 |
| 5,882,211 A | | 3/1999 | Choy et al. | 439/74 |
| 5,901,263 A | | 5/1999 | Gaio et al. | 385/92 |
| D411,827 S | | 7/1999 | Gilliland et al. | D13/147 |
| 5,993,224 A | | 11/1999 | Quillet et al. | 439/79 |

(List continued on next page.)

*Primary Examiner*—Dean A. Reichard
*Assistant Examiner*—Carmelo Oliva
(74) *Attorney, Agent, or Firm*—Beyer Weaver & Thomas, LLP

(57) ABSTRACT

A repeater, useable for connecting switches in a data communication network, is provided in a distributed and/or modular fashion. The repeater includes a plurality of separate and distinct components or modules connected to or at least partially housed in, the various switches which the repeater modules couple. Preferably, the repeater autodetects and/or autoconfigures some or all aspects of repeater operations, such as detecting and/or configuring in response to appropriate or approved cable-type connections. A conductive, sealing member on a cable connector substantially reduces or eliminates EMI.

6 Claims, 5 Drawing Sheets

U.S. PATENT DOCUMENTS

| | | | |
|---|---|---|---|
| 6,047,172 A | 4/2000 | Babineau et al. | 455/300 |
| 6,074,228 A | 6/2000 | Berg et al. | 439/180 |
| 6,108,198 A | 8/2000 | Lin | 361/683 |
| 6,115,263 A | 9/2000 | Babineau et al. | 361/796 |
| 6,123,583 A * | 9/2000 | Huang | 439/607 |
| D436,919 S | 1/2001 | Wakefield et al. | D13/110 |

* cited by examiner

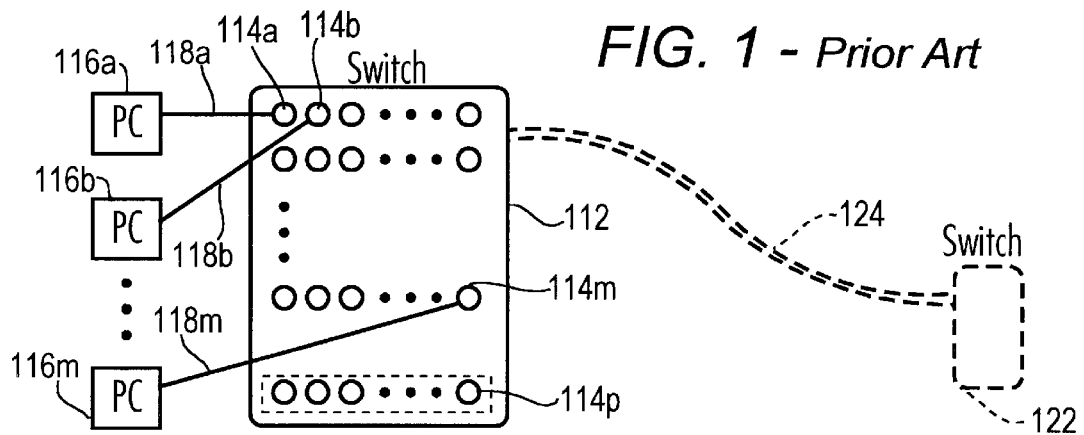
FIG. 1 - Prior Art
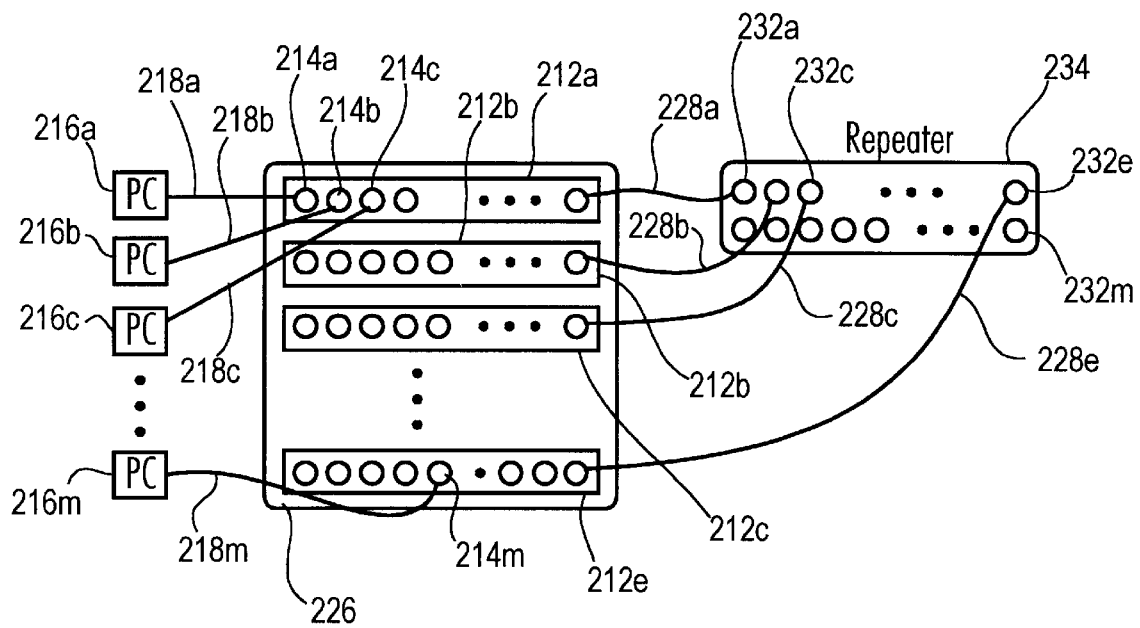
FIG. 2 - Prior Art

CABLE DETECT AND EMI REDUCTION APPARATUS AND METHOD

This application is a divisional application of U.S. patent application Ser. No. 09/330,478 filed on Jun. 11, 1999 now U.S. Pat. No. 6,462,435. Cross-reference is made to U.S. patent application Ser. No. 09/321,066 of Mackay filed May 27, 1999 for "DISTRIBUTED NETWORK REPEATER SYSTEM"; U.S. patent application Ser. No. 09/330,434 of William Edwards, Frederick Schindler and Robert Twiss for "CLOSELY-POSITIONED MULTIPLE GBIC CONNECTORS", filed on Jun. 11, 1999; U.S. patent application Ser. No. 09/330,733 of Chen, DeJager, MacKay, Parameswaran, Sinha, and Twiss for "DISTRIBUTED NETWORK REPEATER MODULE AND METHOD", filed on Jun. 11, 1999; and U.S. patent application Ser. No. 29/106,266 of Huang, Twiss, Van Nguyen and Wood for "REPEATER MODULE", filed on Jun. 11, 1999, all incorporated herein by reference.

The present invention relates to a method and apparatus for cables used in a computer network system, and in particular to detecting proper or approved cables and reducing EMI.

BACKGROUND OF THE INVENTION

Repeaters provided in computer or other networks, such as local area networks (LAN), wide area networks (WAN), telecommunications networks and the like, have typically been provided in monolithic or nondistributed fashion such as providing a single chassis or cabinet for a repeater to which the various signal sources/destinations are coupled e.g. via cables and the like. This configuration can be problematic when the space which is available for accommodating network equipment is limited and/or costly because the monolithic or undistributed repeater device will typically occupy a contiguous and relatively large portion of such space. The problem is exacerbated by the fact that repeaters (especially high-bandwidth repeaters such as repeaters configured for a bandwidth of 1 gigabit per second or more) are typically provided in substantially non-modular form, e.g. are available in a relatively few sizes (both in terms of physical size and the number of ports or connections supported). In such situations, it is impossible or infeasible for a user to be able to obtain a repeater of substantially the currently-required size. Typically, the user must employ a repeater which may be substantially larger and/or support more ports or connections, than actually required. Thus, the non-modular nature of typical repeaters means that more resources (both spatial and financial) are consumed, than necessary to achieve the required repeater functionality.

Another difficulty associated with the non-modular nature of previous repeaters is the inability to be readily reconfigured to accommodate changing conditions. For example, there may be network installations in which it would be desirable to facilitate expansion of the network e.g. as the number of users increases or other conditions change and/or to remove or isolate certain network components in other types of conditions. However, monolithic-type repeaters are included in one or a few discrete sizes on an "all or nothing" basis. Thus, in a typical situation, a network may be configured with a repeater which is over-sized for current conditions, in anticipation of later growth, or as a result of user shrinkage.

Although it is desired to reduce the inflexibility in other disadvantageous aspects associated with undistributed and/or non-modular repeaters, it is preferred that such reduction in inflexibility should not entail an undue increase in the burden of installing, configuring or administering a network. Accordingly, it would be useful to provide a distributed and/or modular, preferably high bandwidth, repeater in which some or all features associated with installing, configuring, maintaining or administering the network are performed substantially automatically such as by automatically sensing installation or removal of repeater modules or module connections. In this regard, "automatically" means substantially without the need for manual, human configuration or installation steps (such as setting switches and the like). For example, preferably repeater modules are readily installed or connected (e.g. by cables) by the end user in a relatively simple "plug in" fashion without the need for additional manipulation, such that the modules and/or associated circuitry sense the insertion, coupling or removal and perform appropriate configuration operations. Accordingly, it would be useful to provide a (preferably high-bandwidth) network repeater which is substantially distributed and/or modular in nature.

Yet another disadvantageous of nondistributed or non-modular repeaters is that malfunctioning or failed units cannot be readily isolated and/or replaced. Accordingly, it would be useful to provide a network repeater having a plurality of modules such that a failed or malfunctioning module can be readily detected, isolated, removed and/or replaced.

In situations where characteristics of components such as cables or other communication links can affect error rates or other performance features, of a repeater, proper operation of the overall system can be substantially influenced by the use (or lack thereof) of the proper type of cable or similar component. Accordingly it would be useful to provide a cable for use in an electronic system, including a distributed repeater system, configured to allow the system to sense whether a proper type of cable is coupled to the normally-used coupler and, preferably, taking appropriate action, in the system, such as suspending certain operations or providing a warning in the event of coupling an improper cable.

In numerous situations it is desirable to reduce or substantially eliminate electromagnetic interference from network devices (and other electronic devices), including cable connections therebetween. Accordingly, it would be useful to provide a cabling device or procedure for assisting in reducing or substantially eliminating electromagnetic interference associated with cable connections.

SUMMARY OF THE INVENTION

At least some aspects of the present invention include a recognition of problems in previous approaches, including problems as described herein. According to an aspect of the invention, a repeater is provided which is distributed in nature. "Repeater," as used in the following, can include a device, function or process which may, in some circumstances, provide full-duplex communication (e.g. bypassing the repeater core) or may otherwise differ from prior usages of "repeater." In one aspect the repeater function is performed by the combined operation of two or more, repeater modules which are spaced from one another and coupled together e.g. via cables. In one embodiment, different modules of the repeater may be housed in different network switches. For example, a computer network may include a plurality of switch boxes or chassis, typically all mounted in one or more racks, often adjacent one another with the switches being coupled to network nodes such as personal computers, work stations and the like. In one embodiment, two or more, in some cases, all, of the switches include one or more regions for receiving repeater modules, with the repeater modules in different switches being coupled to one another by cables and the like. Preferably, at least some aspects of system configuration are performed automatically. In one embodiment, the system will configure the distributed repeater to operate in full duplex mode (e.g. bypassing the repeater core) only if there are exactly two repeater modules coupled by a single (cable) link and otherwise (i.e. if there are three or more coupled repeater modules) the repeater will operate in half-duplex mode.

In one embodiment, a cable is configured to facilitate the system automatically detecting whether the cable, connecting one module to another, has an indicator indicating it is of an approved type and, preferably, the system will suspend or terminate transmissions if the cable does not include an indicator indicating it is of an approved type. In one embodiment, the indicator is other than a direct measurement of the characteristic-of-interest (i.e. a characteristic directly determining whether the cable is within desired or required performance parameters). For example, in one embodiment, the cables which are approved for use are marked by including a predetermined resistance between a specific pair of cable wires and the apparatus to which the cable is coupled includes circuitry for recognizing or detecting the presence or absence of such resistance between the predetermined pair of cable wires.

In one aspect of the invention, a repeater, useable for connecting switches in a data communication network, is provided in a distributed and/or modular fashion. The repeater includes a plurality of separate and distinct components or modules connected to or at least partially housed in, the various switches which the repeater modules couple. Preferably, the repeater autodetects and/or autoconfigures some or all aspects of repeater operations, such as detecting and/or configuring in response to appropriate or approved cable-type connections. The distributed and/or modular repeater facilitates accommodating various switching or repeater needs as a network grows or contracts. Preferably the cable couples are configured to reduce or avoid EMI. In one embodiment a conductive resilient O-ring is associated with a coupling, such as surrounding a sleeve of a cable coupler.

BRIEF DESCRIPTION OF THE DRAWINGS

FIG. 1 is a block diagram depicting a plurality of personal computers coupled to a switch according to previous approaches;

FIG. 2 is a block diagram depicting a plurality of switches coupled to a repeater according to previous approaches;

DETAILED DESCRIPTION

Figure 3A:
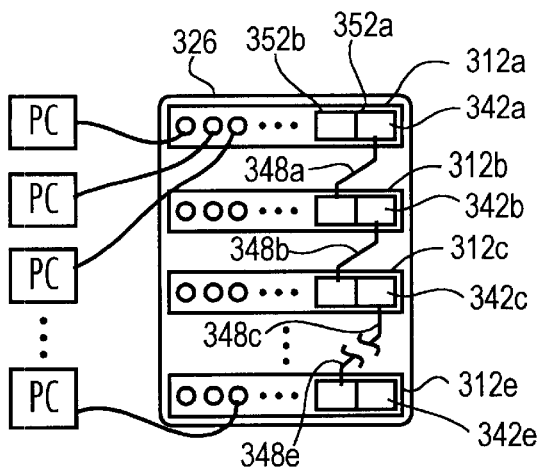
FIGS. 3A–C are block diagrams depicting components of networks with a plurality of switches, each including a repeater module, with repeater modules coupled according to embodiments of the present invention.

As depicted in FIG. 1, a common configuration of previous networks included a switch 112 having a plurality of ports 114$a,b,m,p$ coupled to a variety of network nodes, illustrated, in FIG. 1, by personal computers (PCs) 116$a,b,m$. Nodes can include a variety of items including printers, scanners and the like. Depending, at least in part, on the type of network implemented, the connections can be way of cables 118$a,b,m$, such as coaxial cables, twisted pairs, optical fiber, or one or more wireless links and the like. Often, networks are configured to effectively place limits on the length of the node-connecting cables 118$a,b,m$ and accordingly, in many configurations, the switch 112 must be positioned within a predetermined distance from the nodes 116$a,b,m$. When it is desired to also include nodes positioned beyond such distance, commonly one or more additional switches 122 are placed in a remote location, often coupled by a link such as an optical fiber link 124. In the configuration depicted in FIG. 1, switch 112 has a relatively large number of ports 114$a$ through 114$p$. In some configurations, as depicted in FIG. 2, switch functionality is provided by using a plurality of smaller switch components 212$a,b,c,e$ each with its own set of node-connecting ports 214$a,b,c,m$ coupled e.g. by coaxial or other cable 218$a,b,c,m$ to PCS or other nodes 216$a,b,c,m$. Although the present invention can be used in connection with a plurality of different configurations of switches or other network components, in at least some systems, each of the switches 212$a,b,c,e$ may have, for example, 12 or 24 10/100 ports 214$a,b,c,m$. Commonly, the switches 212$a,b,c,e$ are substantially identical to one another and housed in separate boxes or chassis, such as 1RU form factor chassis, often mounted in a rack or cabinet 226. Even though, in the configuration depicted in FIG. 2, the switch functionality is provided by a plurality of individual switches 212$a,b,c,e$, it generally facilitates configuration and system administration if the plurality of switches 212$a,b,c,e$ can operate substantially as if it were a single switch (similar to switch 112 shown in FIG. 1). Toward this end, in the configuration of FIG. 2, each of the switches 212$a,b,c,e$ is coupled, e.g., via cable 228$a, b,c,e$ to ports 232$a,b,c,e$ of a repeater 234. In general, the repeater receives, from each switch 212$a,b,c,e$, the information or signals (e.g. the signals received at the node ports 214 of each respective switch) and transmits, preferably broadcasts, these signals or information to all of the other coupled switches. Typical repeaters were configured to strive for accuracy in repeating the signals and, typically, changes or modifications to the signals were avoided.

In the configuration as shown in FIG. 2, the repeater 234 is a monolithic (undistributed) repeater, typically housed in a single chassis or box separate from, but relatively close to, the switch boxes 212$a,b,c,e$. The repeater 234 has a predetermined number of ports 232$a,b,c,e,m$. And in general, repeaters were typically available in a relatively small number of discrete sizes such that systems often were provided with somewhat over-sized repeaters, both in terms of the number of ports 232 and the physical size of the repeater box or chassis 234, which was typically related to the number of ports 232. Thus, as shown in FIG. 2, often there were multiple unused ports (e.g. 232$m$) in a repeater 234 for a given system, e.g., in order to provide for possible future expansion or as a result of downsizing from a larger previous network. Commonly, there are costs associated with the space required to accommodate network components such as switches and/or repeaters and, accordingly, many previous systems, due to the undistributed and non-modular modular nature of typical repeaters, essentially required networks to be configured to occupy more physical space than was minimally necessary for the currently-needed network functions. Thus, in many previous systems, the repeater 234 occupied an unnecessarily large space within the rack or cabinet 226, wiring closet, or similar space.

Figure 4:
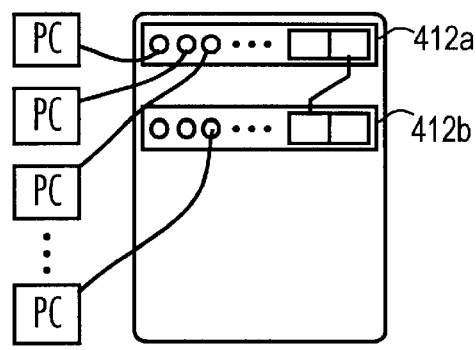
FIGS. 4 and 5 are block diagrams of systems as depicted in FIG. 3 but configured to permit full duplex operation.
Figure 8:
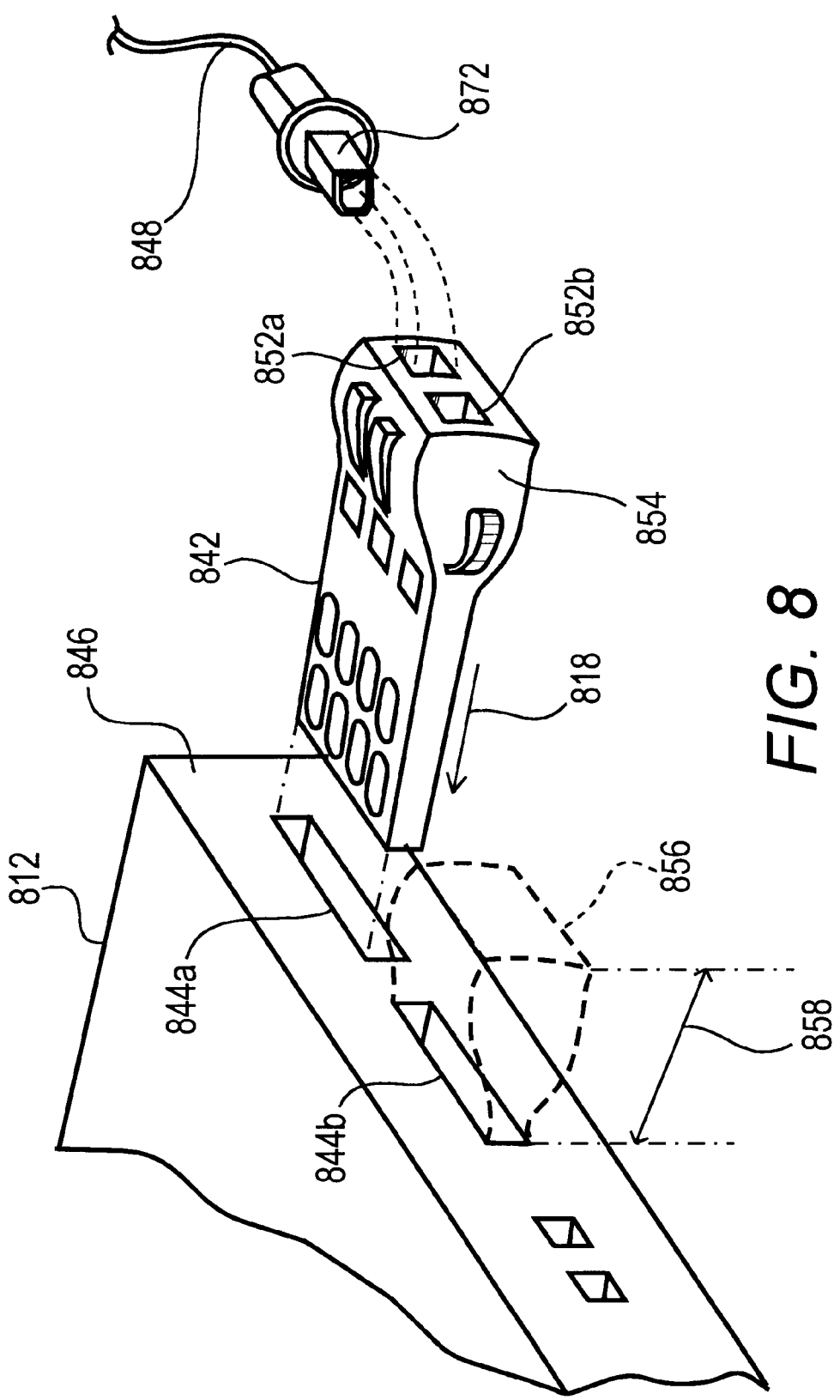
FIG. 8 is a perspective view, partially exploded, of a switch and repeater module according to an embodiment of the present invention.

According to one embodiment of the invention, generally as illustrated in FIGS. 3, 4 and 8, a repeater, preferably a high bandwidth (such as one gigabit per second or more) repeater is provided in a distributed and/or modular form. By "distributed" it is meant that the repeater is made up of, or includes, a plurality of separate, distinct and spaced-apart components. Preferably the distributed repeater components are accommodated in a plurality of a switch chassis or boxes 312a,b,c,e. By distributing the repeater components into the various switch chassis 312a,b,c,e, it is no longer necessary to provide a separate repeater chassis or box 234 of the type depicted in FIG. 2 and thus there is no need to provide separate space in a cabinet, rack 326 wiring closet or similar space to accommodate such a separate chassis or blocks. The components of the distributed repeater will occupy a certain amount of space or volume within the various switch chassis 312a,b,c,e; however, in the distributed repeater of at least some embodiments of the present invention, the cumulative amount of space which the repeater components occupy within the switch boxes is less than the volume of previous separate repeater boxes or chassis 234 (e.g. because of the ability to eliminate certain inefficiencies of space usage in both switch boxes and repeater boxes and at least partially as a result of the modular nature of the distributed repeater, in at least some embodiments).

By "modular," is meant that the distributed repeater includes a plurality of preferably similar or substantially identical repeater modules which can be added or removed to increment, or decrement, preferably with relatively small granularity, the repeater functionality, so as to substantially match the amount of repeater functionality that is provided, to the amount of repeater functionality that is needed (e.g. to avoid a situation such as that depicted in FIG. 2 in which the repeater 234 has substantially more port capability 234m than needed to provide repeater functions for the depicted switches.) In one embodiment, repeater modules are sized (both physically and in terms of function) to provide repeater functions with respect to a particular switch 312a, b,c,e in which the repeater module may be positioned. Preferably, the switches 312a,b,c,e may be populated with repeater modules 342a,b,c,e such that the total repeater functionality cumulatively provided by the repeater modules 342a,b,c,e is matched by the repeater needs presented by switches 312a,b,c,e. Thus, if it were desired to increase the size of the network, e.g. by adding an additional switch, such additional switch could be populated with appropriate repeater modules so that the entire system would still retain the proper amount of total repeater functionality for the total number of switches. Similarly, when it is desired to downsize the network, removal of a switch chassis or box, along with the repeater modules populating such switch, results in a downsized network switching capacity which is still properly matched to the cumulative repeater capability provided by the remaining repeater modules.

Figure 3B:
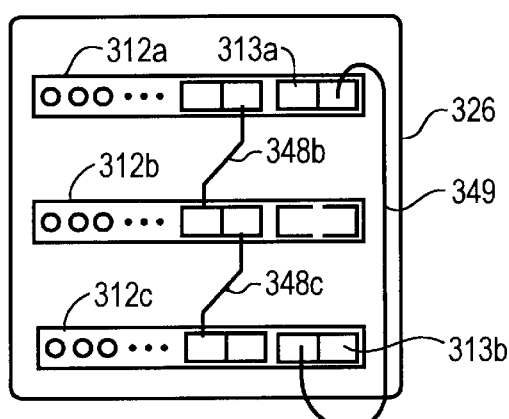
Figure 5:
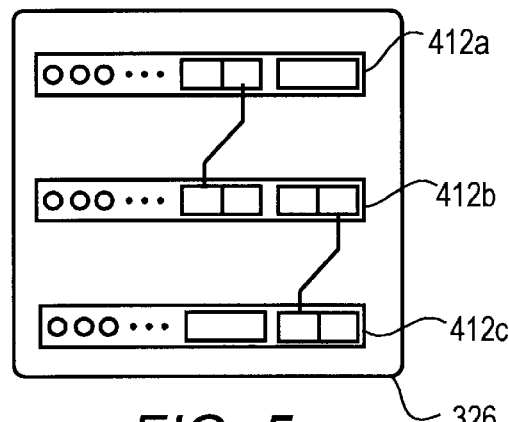
Figure 3C:
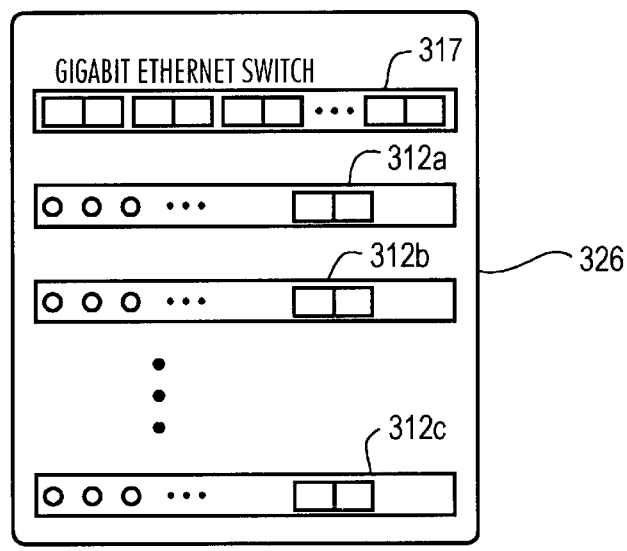

In one embodiment, the system permits a variety of different stacking or other architectures, depending on how the modules and cables are connected. For example, in one configuration, the system can be configured to provide a 1 Gigabit per second (Gbps) independent stack bus (though standard Gigabit Ethernet connections), e.g. as depicted in FIG. 3A, allowing a number (in one embodiment, up to at least nine) switches to be stacked and managed through a single IP address. In another embodiment, the system provides support for a redundant loopback connection 349, e.g. using secondary repeater modules 313a,b in the top and bottom switches, as illustrated in FIG. 3B. In another configuration, a repeater module in each switch can be coupled to high bandwidth (e.g. gigabit) Ethernet switch 317 (FIG. 3C) forming a high-performance point-to-point configuration, to deliver e.g. 2 Gbps full duplex bandwidth between the high bandwidth Ethernet switch 317 and each switch 312a,b,c which is connected via the repeater modules. In one configuration, a number (e.g. up to eight, or more) switches can be aggregated in a Gigabit Ethernet star topology. In one embodiment, a pair of switches can be coupled to provide a full-duplex configuration, as illustrated in FIG. 4 (and as described more thoroughly below). In one embodiment, by employing a secondary repeater module 413 in at least one switch, 412b, two or more full-duplex connections can be provided, as illustrated in FIG. 5.

Although it would be possible to provide switch housings 312a,b,c,e in which repeater modules were built-in, i.e. were not normally end-user removable, in the embodiment of FIG. 8, repeater functionality may be provided with respect to a particular switch box or chassis 812 by inserting one or more high bandwidth repeater modules 842 into openings 844a, 844b provided in on the front panel 846 of the switch box 812 and providing appropriate cabling, such as inserting a first end of an appropriate cable 848 into an opening 852 in the repeater module 842.

As depicted in FIG. 3A, a plurality of repeater modules may be coupled, one to another, such as by cables 348a,b,c,e so that the plurality of repeater modules 342a,b,c,e can, together, provide the desired repeater functionality. As shown in FIG. 3A, in one embodiment, the repeater modules 342a,b,c,e each have left and right cable couplings and are configured such that, during normal operation, a cable, e.g. 348a, will couple a right coupling 352a of a repeater module in one switch 312a to a left coupling 352b of a repeater module 342b in a second switch 312b. In the embodiment depicted in FIG. 8, the repeater module 842 is configured with a flared proximal end 854 which, on the module 842 is fully inserted (to the position 856 depicted, in phantom, in FIG. 8) extends outwardly a distance 858 from the front panel 846 of the switch housing 812.

As noted above, there are circumstances in which it is desirable to automatically determine whether a cable has been connected to either or both of the repeater module cable couplings 852a, 852b. Detecting coupling of a cable can also be useful in other circumstances such as in connection with preventing, reducing or controlling electromagnetic interference (EMI) radiation. In many circumstances, electromagnetic interference (EMI) can be prevented or reduced by enclosing components in a substantially continuous conductive shell. For example, if the switch box 812 constitutes (or includes) a substantially continuous (non-perforated) conductive box or shell, EMI may be substantially reduced or eliminated. However, as seen in FIG. 8, when a repeater module is installed, either of the cable coupling openings 852a, 852b represent a potential break in continuity of the switch shell (effectively, a "hole" or perforation to the shell) which can lead to EMI radiation through the hole, e.g. if the repeater attempts to transmit data through a coupling or connector 852a, 852b which has no cable attached thereto.

Figure 6A:
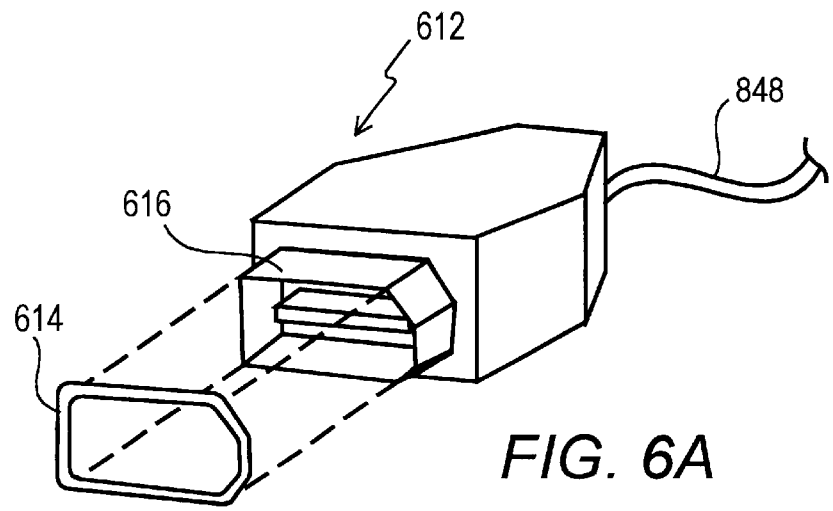
FIGS. 6A and 6B are perspective and cross-sectional views of a cable coupler with conductive member according to an embodiment of the present invention.
Figure 6B:
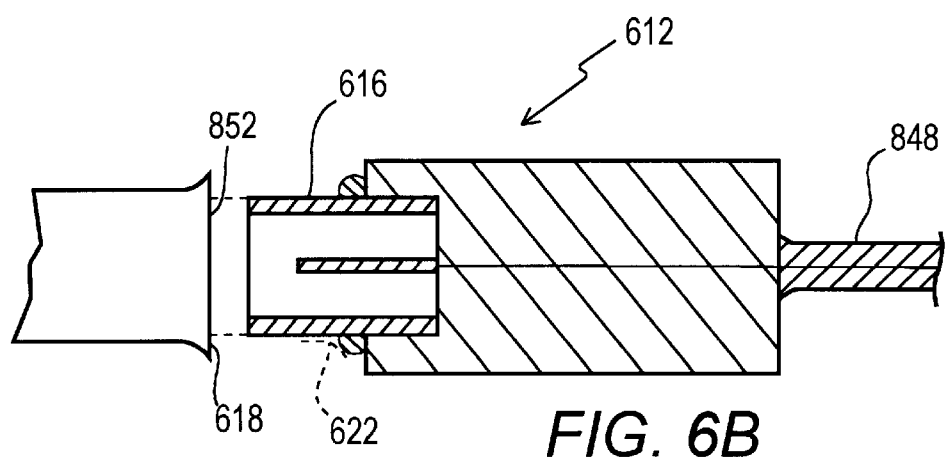

As depicted in FIGS. 6A and 6B, in one embodiment one of the connectors (or both 852, 612) used in coupling a cable 848 to a repeater module cable coupler 852 is provided with a conductive, preferably substantially resilient, gasket member for providing a substantially continuous conductive shell or pathway between the cable coupler 612 and the repeater coupler 852. In the embodiment depicted in FIGS. 6A and 6B, the conductive gasket is in the form of an O-ring 614 which can be positioned about the protruding sleeve 616 of the coupler 612. The O-ring 614 can be formed to a number of materials including silicone rubber based conductive elastomer and metal-impregnated rubber or polymers. Although, in the depicted embodiment, the gasket member 614 is separately formed and then inserted over the sleeve 616, it is also possible to form a resilient O-ring or similar gasket coupled to or as part of some or all portions of the cable coupler 612. The O-ring 614 forms a substantially continuous conductive device substantially surrounding the entire circumference of the sleeve 616. As seen in FIG. 6B, when the cable coupler 612 is coupled to the repeater coupler 852, the O-ring 614 will preferably be contacted by, and substantially compressed against, a frame or flange 618 of the repeater coupler 852 when the two couplers are fully engaged 622. Such an arrangement avoids any openings or gaps around the periphery of the engaged couplers which might otherwise exist in the absence of the gasket 614 and which are believed to lead to EMI.

Figure 7:
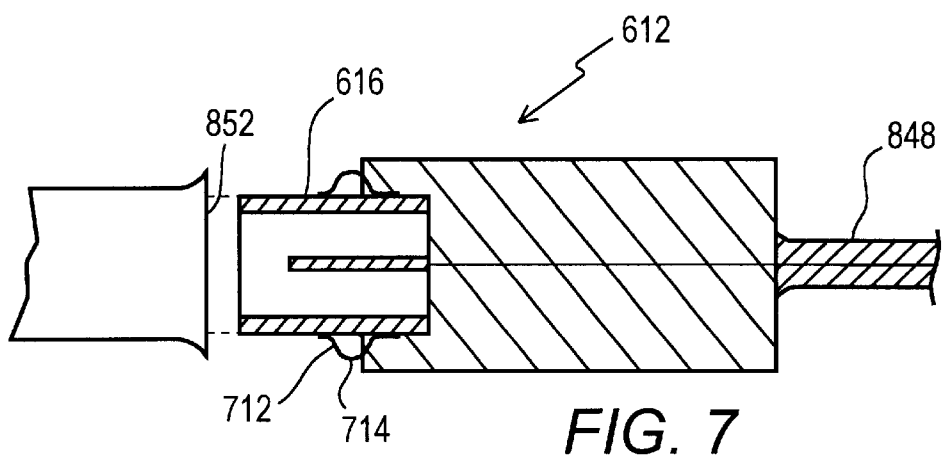
FIG. 7 is a cross-sectional view of a cable member coupling with a conductive member according to an embodiment of the present invention.

In the embodiment depicted in FIG. 7, rather than an O-ring, a continuous collar or finger member 712, preferably with an outwardly extending circumferential rib 714 is positioned substantially surrounding the sleeve 616, e.g. by having an edge embedded in a shoulder region of the cable coupler 612. The collar 712 is shaped to form a circumferentially continuous conductive contact with the throat of the repeater coupler 852. Preferably, the O-ring 614, collar 712 or similar gasket member is (directly or indirectly) electrically coupled, e.g. to a ground line (e.g. chassis ground) or similar conductive line of the cable 848.

The characteristics of the cable used to couple repeater modules can have significant effect on data integrity. Among the cable characteristics potentially affecting data integrity are cable length and the material and quality of the individual cable conductors or wires, as well as their configuration (twisted, coaxial and the like), insulation, etc. Many previous approaches have distinguished different cable types by physical means such as the shape, size, presence or absence of (and number of) pins, fingers and the like of cable connectors. However, in many situations, it is desired to avoid costs of designing and achieving approval and/or standardization for a new cable connector, particularly for relatively low-volume cables. Accordingly, it is preferred to provide a system permitting validation or identification of a proper cable without having to rely on a new or unique connector shape or the like.

It is possible to provide or design instruments or procedures for directly measuring the cable characteristics-of-interest such as cable length, conductivity, permissivity, crosstalk and the like. However, if it is desired to provide cable identification or validation at the point of cable coupling (e.g. to avoid having to couple a cable first to a validation device and then to a repeater module) it can be undesirably complicated or expensive to include circuitry for directly measuring characteristics-of-interest such as conductivity, permissivity, and the like, on each repeater module.

According to one embodiment of the invention, cables are provided such that, in cables which are appropriate and/or approved e.g. for use in connection with the repeater modules, an easily, detectable indicative characteristic is imparted, different from the characteristic-of-interest which affects cable performance (such as cable length, permissivity, conductivity and the like). The easily detectable characteristic upon (preferably automatic) detection, can be used to indicate that the cable which has been connected is a proper or approved cable type. In one embodiment, it is the combination of a connector shape, size configuration or the like (which may be a standard connector, not unique to approved cables) and the automatically-detected indicative cable characteristic which serves to validate or identify the cable.

In the embodiment depicted in FIG. 8, the cable 848 is provided with a connector 872 which complies with the IEEE 1394 cable standard. The cable itself 848, for use in connection with the present invention, preferably complies with standards which are substantially stricter than (and/or different from) IEEE 1394 standards (such as a length of no more than about 1 meter). Thus, it is desired to avoid a situation in which the user may attempt to employ a IEEE 1394 cable, perhaps inadvertently, to couple repeater modules of the present invention. While such cables might physically plug into or fit the repeater module openings 852a,b of similar cable-receiving couplings, such an attempted use of IEEE 1394 cables would likely provide unsatisfactory performance such as relatively high error rates, if such cable did not comply with the stricter standards. Because of the physical compatibility of the cable connectors associated with IEEE 1394 cables and cables contemplated for use in connection with embodiments of the present invention, it is also possible that users may inadvertently employ cables intended for coupling repeater modules according to the present invention for normal IEEE 1394 cable uses. It is, in general, preferred that cables according to the present invention, and as described more thoroughly below, will be compatible such inadvertent uses, at least in this sense that the cables according to the present invention are substantially unlikely to cause harm to coupled equipment when used in place of an IEEE 1394 cable.

The cable 848 according to the present invention includes at least a first "receive" pair of conductors, typically a twisted pair, termed $Rx^+/Rx^-$ and a pair of "transmit" conductors, also typically twisted pair, termed $Tx^+/Tx^-$. Preferably, the cable 848 also includes a third pair of wires which may be used e.g. as a return path for any current imbalance that may exist between the differential pair. It is noted that IEEE 1394 cables also include two twisted pairs and a third pair of conductors. In typical uses for IEEE 1394 cables, the third pair of conductors conveys power. In one embodiment of the present invention, the "indicative" characteristic of the cable which is sensed (and which is not-of-interest, i.e. not directly a measurement of items of interest such as cable length) is a characteristic related to the third pair of conductors. As noted above, the indicative characteristic preferably is provided so as to avoid the potential for equipment harm resulting from any inadvertent use of a cable according to the present invention in an IEEE 1394 application. Furthermore, the indicative characteristic should not interfere with intended operation of the cable in connection with the repeater module, such as the intended function of the third pair as a return path for current imbalance.

According to one embodiment of the present invention, a distinctive characteristic of the cable involves providing a resistance between the third pair of conductors (or between pins or leads coupled thereto) of a known value (or within a known range) which can be readily detected in a fashion which does not interfere with intended operation of the cable. In one embodiment, a resistance greater than about 200 ohms (implemented, in one embodiment, by two 420 ohm resistors in parallel) is provided between the third pair of conductors. Such resistance will not interfere with the normal use of the third pair of conductors as a return path for current imbalance and will typically result in no more than about ⅛th watt dissipation if the cable were inadvertently used in an IEEE 1394 application (and thus would typically reduce or avoid risk of harm to IEEE 1394 equipment). Thus, in one embodiment, the indicative characteristic is the amount of resistance between a predetermined pair of pins coupled to predetermined cable conductors. Such resistance is not a cable characteristic-of-interest (in the sense that it is not the cable characteristic(s) which is being verified in order to insure data integrity) but is rather a mark, sign or signal, different from the cable length or other characteristic of interest, to identify the cable or validate that the cable has been manufactured or verified to be of a type which provides the characteristic of interest (such as a maximum cable length). I.e. according to this aspect of the invention, in order to verify that the cable has a characteristic-of-interest (such as a maximum length), the present invention involves measuring a different characteristic which is not the characteristic-of-interest, but which serves as a marker or identifier of a cable type. As can be seen, the present invention provides that the indicative characteristic of the cable can be determined regardless of whether the opposite end of the cable is free or is coupled to other equipment. Preferably, the present invention involves measuring or detecting a non-zero and finite value. For example, it is preferred that the indicative or marking characteristic of the cable should not be provided by merely shorting the third conductor pair (so as to provide a zero resistance), at least because such an approach would potentially lead to harm if the cable were connected to IEEE 1394 equipment (since it would effectively short the power lines).

Figure 9:
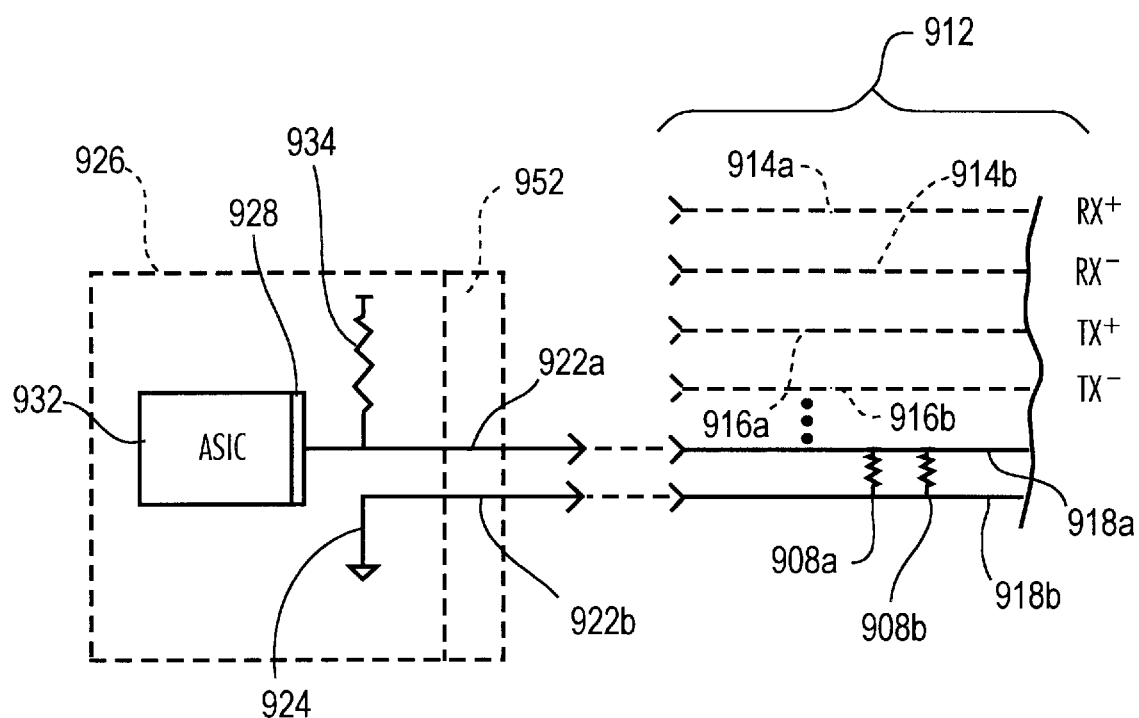
FIG. 9 is a schematic diagram depicting a system for detecting a cable type according to an embodiment of the present invention.

FIG. 9 illustrates a system which can be used for detecting the cable indicative characteristic, for verifying or identifying the cable according to an embodiment of the present invention. In one embodiment, cable identifying or validating features are provided in the circuitry of the each repeater module 84. Although its possible to provide separate circuitry or procedures for detecting the presence of the cable and for validating or identifying cable type, the configuration of FIG. 9 can be used to perform both functions. In the embodiment depicted in FIG. 9, the cable 912 includes the Rx⁺/Rx⁻ cable pair 914a,b, the Tx⁺/Tx⁻ cable pair 916a, b and a third cable pair 918a,b. The coupler 952 of the repeater module thus provides 6 pins, of which two 922a, b are shown in FIG. 9, corresponding to (and connectable with) the third pair of cable conductors 918a,b. One of the two repeater module pins, one 922b is connected to ground on the repeater module printed circuit board (PCB) 926. The other connector 922a is coupled to a readable device such as a software readable register 928 which may be part of an ASIC 932. The line to the register 928 is also coupled to a pull-up resistor 934 having a relatively large value such as about 1 Megohm. In practice, if no cable is connected to the coupler 952, reading the register 928 will result in a "high" value because of the presence of the pull-up resistor 934. Similarly, if an IEEE 1394 cable (in which the power lines are not coupled together by a resistance) is coupled to the cable connector 952, there will be no path from the first pin 922a to ground 924 and, because of the presence of the pull-up resistor 934, the register 928 will still contain a "high" value. However, if a cable 912 as depicted in FIG. 9 is coupled to the connector 952, there is a path from the first pin 922a, to the first cable conductor 918a, through the resistance (in the illustrated case, through the parallel resistors 908a, b) and thence, via the second pin 922b, to ground 924, so that the value in the register 928, when read, will indicate a "low" value.

In one embodiment, whenever the value in the register 928 is a "high" value, the ASIC is configured to prevent or interrupt any attempts to transmit over the connector 952, such as by disabling a transmitter on the ASIC 932. In this fashion, if an IEEE 1394 cable (which is not verified as meeting the more stringent requirements needed or desired in connection with embodiments of the present invention) is coupled to the repeater module, the system will not operate unless and until the improper cable is replaced with a proper cable which includes an indicative characteristic as described herein. If desired, the module 842 may be configured to output (or cause other components to output) a signal (such as a light, light pattern, color, lack of a light, display, printout or the like) intended to inform a user or administrator that the cable is not properly connected or is of an improper type. Similarly, if there is no cable connected to the connector 952, no attempt will be made to transmit data and the risk of EMI via the connector opening 852a, 852b will be substantially reduced or eliminated.

In light of the above description a number of advantages of the present invention can be seen. By providing a repeater which is distributed, a system can be configured such that multiple switches (e.g. mounted in a rack) can be treated by an administrator as if they were a single switch (e.g. allowing management of multiple switched ports from a single IP address), yet without requiring accommodating the substantial space occupied by a monolithic or non-distributed repeater (preferably providing interconnected switches with an independent high-speed stacking bus that preserves valuable desktop ports). Preferably the repeater components are end-user installable and removable, i.e. do not need to be installed or removed by specially trained personnel (e.g. can be installed or removed by a system administrator), or using special tools. By providing a modular repeater, a system can be readily expanded or downsized including expansion or downsizing of repeater functionality, so as to reduce or substantially avoid excessive and unneeded repeater capability. Expansion can be provided with relatively small granularity, such as by purchasing and adding, at any one time, a small (e.g. 12 or 24 port) switch and one or two small (and relatively inexpensive) repeater modules sized to such switch. The present invention provides for implementing a system which is at least partially autodetecting and auto-configuring in the sense that repeater functionality may be added to or removed from the system, or the system may be otherwise be reconfigured, by inserting or removing modular units and/or cables, preferably in fashion requiring only front panel access, without the need to manually set switches or otherwise perform configuration operations other than inserting or removing cables or modules. Preferably, expansion or reduction of a system can be accomplished without the need for suspending or disabling operation of communication system or otherwise disrupting communications. In one embodiment, the autodetection and configuration includes automatically detecting whether a distributed repeater module port is coupled to a cable and/or whether the cable is of a proper type and, preferably, taking appropriate actions such as disabling or interrupting a repeater transmitter when a cable is not connected or is of the improper type. In this way, the system can, preferably substantially automatically, configure itself so as to avoid undesirable levels of EMI (thus reducing EMI radiated from the distributed repeater at least because the software can determine when to enable and disable transmitters based on sensing a cable connection) and/or to avoid data loss or and maintain data integrity (thus, improving reliability of connections made since the user will know, when a cable is installed, whether the cable is correct or incorrect). By providing the ability for a system administrator or other end-user to readily form the components of the present invention into any of a plurality of configurations, preferably by using relatively inexpensive repeater modules, the present invention can provide relatively high flexibility and investment protection and manageability in a manner readily implemented by a system administrator. The system described herein can provide highly flexible, preferably substantially scalable, stacking and/or connectivity options. It can provide high bandwidth (e.g. 1 Gbps) half-duplex connectivity in a daisy-chained configuration or full-duplex (e.g. up to 2 Gbps or more) connectivity in a dedicated, switch-to-switch configuration. The system described herein can be used to implement systems which expand the traditional stacking domain beyond a single wiring closet, allowing users to select and combine a plurality of interconnections to accommodate a range of management, performance and cost needs.

A number of variations of modifications of the present invention can also be used. It is possible to use some features of the invention without using others. For example, it is possible to use the invention in connection with a repeater which is distributed but not necessarily modular and vice versa. It is possible to provide a distributed and/or modular repeater without providing some or all of the sensing and/or configuring features such as sensing or configuring for appropriate cable connections. Although a cable (and cable connector) was described which can be used with embodiments of the present invention, it is possible to implement some or all features of the present invention using other communication links, such as other types of cables or connectors, optical cables, and the like. Although certain, preferably front-panel, connections were illustrated, repeater modules may be coupled to each other or to other circuitry, in other fashions, including internally in the switch box, by cables and/or by leads or circuitry, e.g. on one or more switch PCBs. Although automatic detection of a characteristic which is not-of-interest (an "indicative" characteristic) as a marker for identifying or validating the cable was described in connection with repeater module cables, including the system as implemented with a predetermined resistance provided between cable conductors and preferably automatically detected, this aspect of the invention can be used in connection with many types of cables and electronic components including cables in connection with stand-alone and/or networked computers or work stations, telephone or other telecommunications cables, wide area network or Internet cabling, fiber optic cables, cable-television cables, audio or video equipment cables and the like. Although in the described embodiment the characteristic not-of-interest was provided with respect to wires or conductors normally present in the cable, it is possible to provide for characteristics which are measured with respect to conductors or other components provided in the cable which are not normally present and/or are provided for the sole purpose of cable identification or validation. Although embodiments of the present invention have been described in connection with providing a predetermined resistance between a pair of conductors, other characteristics can be used for identifying or marking cables in a readily-detectable, preferably automatic, fashion such as providing different resistances between two or more different pairs of a cable, providing characteristics other than, or in addition to, resistance with respect to cable pairs, such as providing capacitance or inductance characteristics (or combinations), providing active or passive pollable identifiers or transponders in the cable and/or connector, and the like. In some embodiments, any of a plurality of different values of resistance or other parameters can be provided for identifying different types of cable. For example, a resistance of about 200 ohms across a given wire pair may indicate a first cable type and a resistance of about 400 ohms across the same pair may indicate a second cable type.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for avoiding electromagnetic interference in a region where a cable coupler having a sleeve member extending therefrom is connected to a cable-receiving coupling of an electronic device comprising:
   a substantially conductive, resilient O-ring substantially surrounding said coupler sleeve member, wherein
   said resilient O-ring is disposed on said cable coupler in a manner such that when said cable receiving coupling engages said sleeve member, said resilient O-ring is compressed in a direction of insertion of said cable receiving coupling into said sleeve member, thereby terminating a circumferential gap between said cable receiving coupling and said sleeve member.

2. Apparatus as claimed in claim 1 wherein said O-ring is formed from a material selected from the group consisting of metal-impregnated polymers and silicone conductive elastomer.

3. Apparatus as claimed in claim 1 wherein said O-ring forms a substantially continuous conductive pathway around the circumference of said sleeve member and also around a circumference of said cable-receiving coupling.

4. A method for avoiding electromagnetic interference in a region where a cable coupler, having a sleeve member extending therefrom, is connected to a cable-receiving coupling of an electromagnetic device comprising:

providing an O-ring formed of a substantially conductive resilient material, having a size to accommodate said sleeve member, said O-ring being disposed on said cable coupler in a manner such that when said cable receiving coupling engages said sleeve member, said O-ring is compressed in a direction of insertion of said cable receiving coupling into said sleeve member, thereby terminating a circumferential gap between said cable receiving coupling and said sleeve member, and inserting said sleeve member through the central opening of said O-ring.

5. Apparatus for avoiding electromagnetic interference in the region where a cable coupler is connected to a cable-receiving coupling of an electronic device comprising:

a substantially conductive, resilient gasket means positioned to form a conductive seal substantially surrounding said region where said cable coupler is connected to said cable-receiving coupling, when said cable coupler and said cable receiving coupling are engaged, wherein said gasket means is disposed on said cable coupler in a manner such that when said cable receiving coupling engages said cable coupler, said gasket means is compressed in a direction of insertion of said cable receiving coupling into said cable coupler, thereby terminating a circumferential gap between said cable receiving coupling and said cable coupler.

6. Apparatus for avoiding electromagnetic interference in a region where a cable coupler having a sleeve member extending therefrom is connected to a cable-receiving coupling of an electronic device comprising:

a substantially conductive collar substantially surrounding said sleeve member, said collar having a radially outwardly protruding rib, wherein said collar is disposed on said cable coupler in a manner such that when said cable receiving coupling engages said sleeve member, said collar is compressed in a direction of insertion of said cable receiving coupling into said sleeve member, thereby terminating a circumferential gap between said cable receiving coupling and said sleeve member.

\* \* \* \* \*